US006698266B2

(12) United States Patent
Brower (10) Patent No.: US 6,698,266 B2
(45) Date of Patent: Mar. 2, 2004

(54) SYSTEM AND METHOD FOR OPTIMIZING MILL CUTS

(75) Inventor: Mervin W. Brower, Salem, VA (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 09/681,337

(22) Filed: Mar. 20, 2001

(65) Prior Publication Data

US 2003/0033913 A1 Feb. 20, 2003

(51) Int. Cl.[7] .................................................. B21B 1/00
(52) U.S. Cl. ........................ 72/203; 72/8.3; 700/145; 83/29; 83/86; 83/370
(58) Field of Search ....................... 700/145, 160, 700/173, 122; 72/8.8, 203, 11.1, 11.5, 12.5, 8.3, 204; 83/29, 79, 86, 370

(56) References Cited

U.S. PATENT DOCUMENTS

| 3,170,355 A | * | 2/1965 | Neely, Jr. .................... 83/362 |
| 3,331,952 A | * | 7/1967 | Clyne .......................... 700/145 |
| 3,552,163 A | * | 1/1971 | Lloyd ........................... 72/11.5 |
| 3,841,180 A | * | 10/1974 | Gutlbauer et al. ............. 83/15 |
| 4,724,696 A | | 2/1988 | Sumino |
| 5,125,250 A | * | 6/1992 | Sun .............................. 72/8.5 |
| 5,406,870 A | | 4/1995 | Suitts et al. |
| 5,644,941 A | * | 7/1997 | Stodt et al. ................... 72/201 |
| 6,240,763 B1 | * | 6/2001 | Benedetti ..................... 72/239 |

FOREIGN PATENT DOCUMENTS

| DE | 2248177 | * | 9/1972 | |
| GB | 1391475 | * | 4/1975 | |
| JP | 03060913 A | * | 3/1991 | ........... B23D/36/00 |

* cited by examiner

Primary Examiner—Allen Ostrager
Assistant Examiner—John S Goetz
(74) Attorney, Agent, or Firm—Hunton & Williams LLP (57) ABSTRACT

A method for controlling a bar processing mill having an exit and a cooling bed to produce bars of a predetermined cold length. The method includes, for a first bar in a processing order, calculating a long hot cut length based, at least in part upon a predetermined cold length. In addition, the method includes adjusting the long hot cut length based on a total length of bar exiting the exit, if the long hot cut length is greater than a minimum cooling bed length, and if a number of layers of bars to be processed on the cooling bed is less than a predetermined number.

22 Claims, 3 Drawing Sheets

SYSTEM AND METHOD FOR OPTIMIZING MILL CUTS

BACKGROUND OF THE INVENTION

The invention relates to a system and method for controlling a bar processing mill. More particularly, the invention relates to a system and method for determining an optimized hot cut length so as to minimize the number of cold saw cuts when processing bars.

In typical bar processing mills, a customer will order bars of a predetermined cold length (i.e., the finished length of the bar). A typical bar processing mill has a crop and divide shear for cutting a bar when it is hot coming from bar mill stands, and a cold saw to make the final cut to length after the bars have cooled on a cooling bed.

In a specialty bar mill such as a Special Quality Steel (SBQ) Mill where many of the customer's orders are for relatively small batches of bars. It is usually not economical to run the mill for a single small order, thus, multiple small orders must be processed together. It is imperative that the customer get the steel type ordered, however, in order to reduce post processing steps, it is advantageous to keep the orders separate during the process. In existing systems, keeping the orders separate has the effect of increasing the number of cold saw cuts, which, in turn, increases processing time. Existing systems for large batch processing typically optimize hot cut lengths to fill a cooling bed. This processing technique may cause a sizable difference between the longest bar and shortest bar on the cooling bed. On small orders this difference can cause handling problems at the cold saw which lead to delays in mill operation.

In view of the foregoing, it is desirable to provide a technique for processing bars which overcomes the above-described inadequacies and shortcomings. More particularly, it is desirable to provide a technique for optimizing the number of cold saw cuts to enable bar processing in an efficient and cost effective manner.

SUMMARY OF THE INVENTION

According to the present invention, a technique for controlling a bar processing mill, having an exit and a cooling bed, to produce bars of a predetermined cold length, is provided. In one embodiment, the technique is realized by identifying a first bar in a processing order, and calculating a long hot cut length based, at least in part, upon a predetermined cold length. Next, the technique is realized by adjusting the long hot cut length, based on a total length of bar at the exit. Preferably, adjusting the long hot cut length is carried out if the long hot cut length is greater than a minimum cooling bed length, and if a number of layers of bars to be processed on the cooling bed is less than a predetermined number.

In accordance with other aspects of the present invention, a system is provided for controlling a bar processing mill, having an exit and a cooling bed, to produce bars of a predetermined cold length. In one embodiment the system may comprise a first bar identifier for identifying a first bar in a processing order. The system may further comprise a hot cut length calculator for calculating a long hot cut length and short cut length based, at least in part upon a predetermined cold length, such that the long and short cut length are different by the length of one cold cut, and a total billet will be cut into these two parts. In addition, the system may comprise a long hot cut length adjuster for adjusting the long hot cut length, based on a minimum cooling bed length, if the long cold shear length is greater than a minimum cooling bed length, and if a number of layers of bars to be processed on the cooling bed is less than a predetermined number.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

DETAILED DESCRIPTION OF THE DRAWINGS

Figure 1:
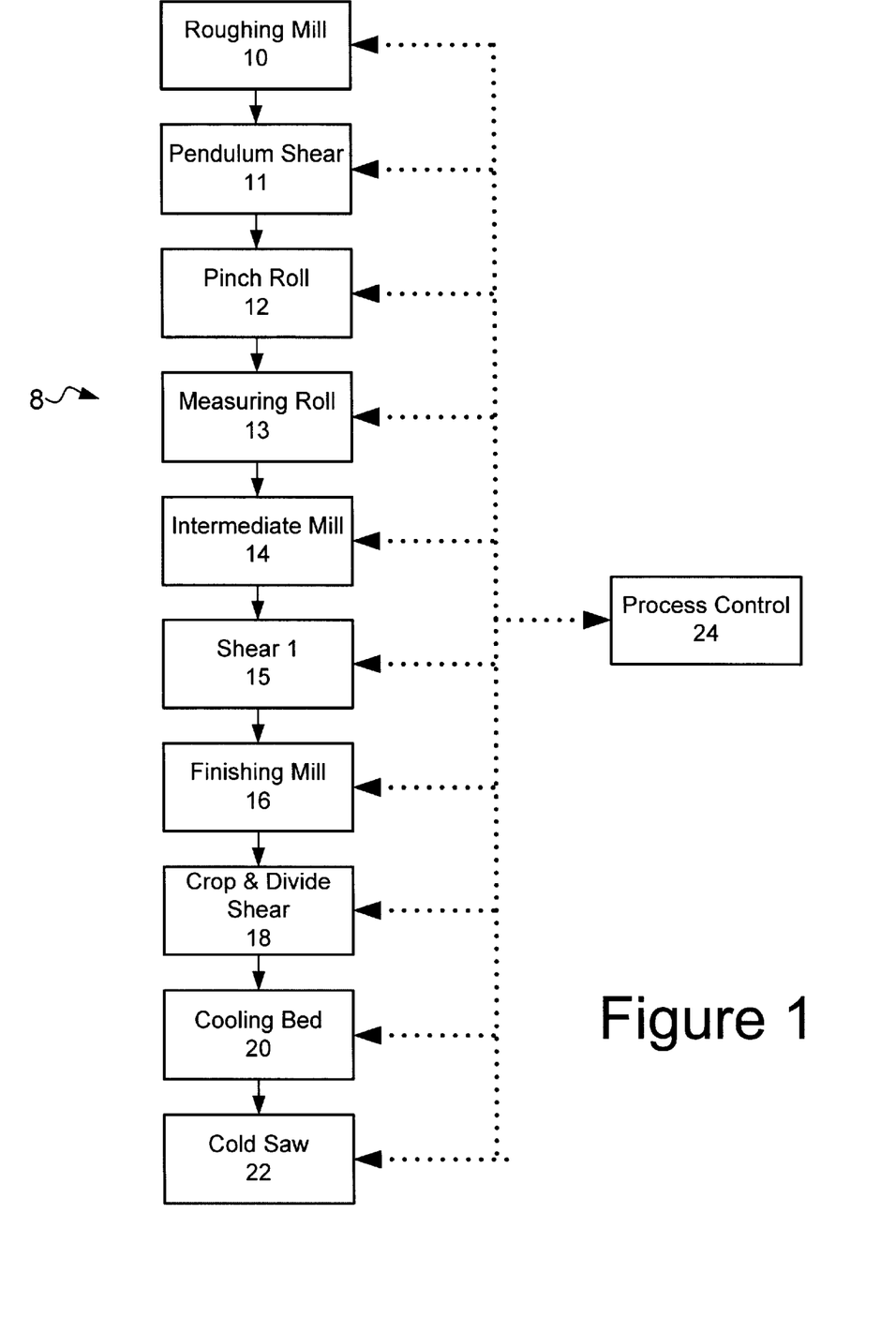
FIG. 1 is a schematic representation of a bar processing mill according to one embodiment of the invention.

FIG. 1 is a schematic representation of a bar processing mill 8 according to one embodiment of the invention. Other types of bar processing mills are possible and the present invention is not limited to the embodiment described herein.

As shown in FIG. 1, one embodiment of a bar processing mill 8 may comprise roughing mill 10, pendulum shear 11, pinch roll 12, and measuring roll 13, intermediate mill 14, and shear 15, finishing mill 16, crop and divide shear 18, a cooling bed 20, a cold saw 22.

Bar mill items 10–18 may be used for reducing a bloom, or billets, into bars of different size depending on the customer's order. Any suitable bar mill may be used to accomplish a reduction of a bloom or billet to a round or square shape, for example, by reducing the area and increasing the length. In some embodiments, a bar mill 8 may comprise a number of stands to assist in bar processing. For example, ten to twenty-three stands, each stand driven by a single motor or a group of stands driven by one motor may be used. Similarly, an additional three to four shears may be used. Other types of mills stands may be used. For example, finishing mill 16 may comprise Kocks reduction blocks.

As noted above, some embodiments of processing mill 8 may comprise a crop and divide shear 18. Any suitable crop and divide shear may be used to accomplish the dividing of the bar into a hot cut length that will fit on a cooling bed (e.g., cooling bed 20) and preferably in some multiple of the cold cut length. In some embodiments, crop and divide shear 18 may comprise a drum shear. Other crop and divide shears may be used. For example, crop and divide shears may comprise a crank shear or a pendulum shear.

Processing mill 8 may also comprise a cooling bed 20. Any suitable cooling bed may be used to accomplish the function of cooling the hot bar and transporting it to the next processing step (e.g., cold saw 22). In some embodiments, multiple cooling beds may be used. For example, processing mill 8 may comprise a large cooling bed and a small cooling bed. In some embodiments, cooling bed 20 may comprise a fixed rake and moving rake type cooling bed, or a walking beam type rake on a cooling bed with separate motors for traverse and lift. Other cooling beds 20 may be used. For example, a cooling bed employing a fixed rake and movable rake driven by one motor may be used.

Processing mill 8 may also comprise a cold saw 22. Any suitable cold saw 22 may be used to accomplish cutting layers of bars into their final length. Other methods of cutting the layers may be used, such as a cold shear may be used.

In some embodiments, process control 24 may enable automatic control of processing mill 8 and its associated components. Process control 24 may comprise any suitable control device capable of enabling control over processing mill 8 and its components. For example, process control may comprise a computer or other microprocessor based device, a distributed system of microprocessor based devices, or other suitable information processing device. In addition, some embodiments of process control 24 may include processor controllable devices. For example, valves, saws, material handlers, and other bar mill processing components may be controlled by a processor based device or system of processor based devices.

In FIG. 1 the connection between process Control 24 and other system components is indicated in dashed lines to indicate that the connection may be something other than a direct connection. For example, process Control 24 may not be in actual physical connection with cooling bed 20, but may communicate with other controllers which connect to sensors or other associated devices that affect the operation of cooling bed 20.

In some embodiments, process control 24 may receive input from various sources. For example, process control 24 may receive input indicating physical attributes (e.g., length, width, temperature, etc.) of the bars being processed.

Process control 24 input may be collected by various data collection devices and other detectors in the system. For example, a measured bar length may be input from measuring roll 13 between roughing mill 10 and intermediate mill 14. In some embodiments, the measured bar length may be used to calculate a bar exit length. Alternatively, an exit length may be derived from a billet or bloom weight initially put into roughing mill 10.

Other data may also serve as input to process control 24. For example, the head and tail of the bar may be cut by a determinable amount as it goes through the mill (e.g., by pendulum shear 11, shear 15, or shear 18). The length of bar removed may serve as input to control process 24 for use in other parts of the process as discussed below.

The following definitions are provided to simplify the description of some embodiments of the invention. In some embodiments the following data may be input to an appropriate device (e.g., process control 24) prior to the start of a process order:

csl=Cold Saw Cut Length;
$ON_{blooms}$=The number of blooms in an heat
$first_{blooms}$=The first bloom of a heat.

Where the cold saw cut length is the ultimate finished product length the customer has ordered, the number of blooms is the number of pre-process bars from a caster, and a heat is the total amount of steel to be processed for a given customer order.

In some embodiments, the following information may be stored in an appropriate device (e.g., process control 24)

$A_{rhmill}$=The area of bar from the roughing mill;
$A_{std9}$=The area of bar from the intermediate stand before shear 15;
$A_{exit}$=The area of bar at mill exit
$D_{bar}$=The diameter of the bar exiting the mill In some embodiments, the following information may be measured and input into an appropriate device (e.g., process control 24):

$l_{rhmill}$=The length of bar from the roughing mill;
$pd_{hl}$=The pendulum shear head cut length;
$pd_{tl}$=The pendulum shear tail cut length;
$shr1_{hl}$=The shear 15 head cut length;
$shr1_{tl}$=The shear 15 tail cut length;
$shr2_{hl}$=The shear 18 head cut length;
$shr2_{tl}$=The shear 18 tail cut length;
$1_{c\ min}$=Minimum cut length cooling bed can handle (although, in some embodiments, this quantity may be calculated from other parameters for the small cooling bed).

In some embodiments, information that is fixed information (e.g., information pertaining to the physical capabilities of system components) may be stored in an appropriate device (e.g., process control 24). In some embodiments, fixed information includes:

$1_{cmax}$=Maximum hot cut length cooling bed can handle;
$t_{smin}$=Minimum KICKOFF cycle time;
$CB_{length}$=Cooling bed length;
$CB_{max\ width}$=Cold Saw maximum cut width;
$1_{cool\ min}$=The Minimum length that will be allowed on the cooling bed.

Table 1 shows correction factors for one embodiment of the invention. The correction factors may be determined in any suitable manner. For example, the correction factors may be derived empirically from experimental data, calculated from formulas, or other appropriate method. Other values of correction factors may be used.

TABLE 1

| | Length tolerances for hot rolled steel bars | | | |
|---|---|---|---|---|
| SIZE | 13 TO 20 ft | 20 TO 30 ft | 30 TO 40 ft | 40 TO 50 ft |
| TO 1 IN | .75 | 1.25 | 1.75 | 2.25 |
| 1 TO 2 | 1 | 1.5 | 2 | 2.5 |
| 2 TO 5 | 1.5 | 1.75 | 2.25 | 2.75 |
| 5 TO 8 | 2.5 | 2.75 | 3 | 3.25 |

In some embodiments, the following information may be input by a process operator into an appropriate device (e.g., process Control 24):

SCRAP=Length for head and tail crops at cold saws;
Temp=Temperature for expansion calculation of hot bar length;
$1_{cor}$=Vernier correction to bar length as entered by an operator.

Figure 2:
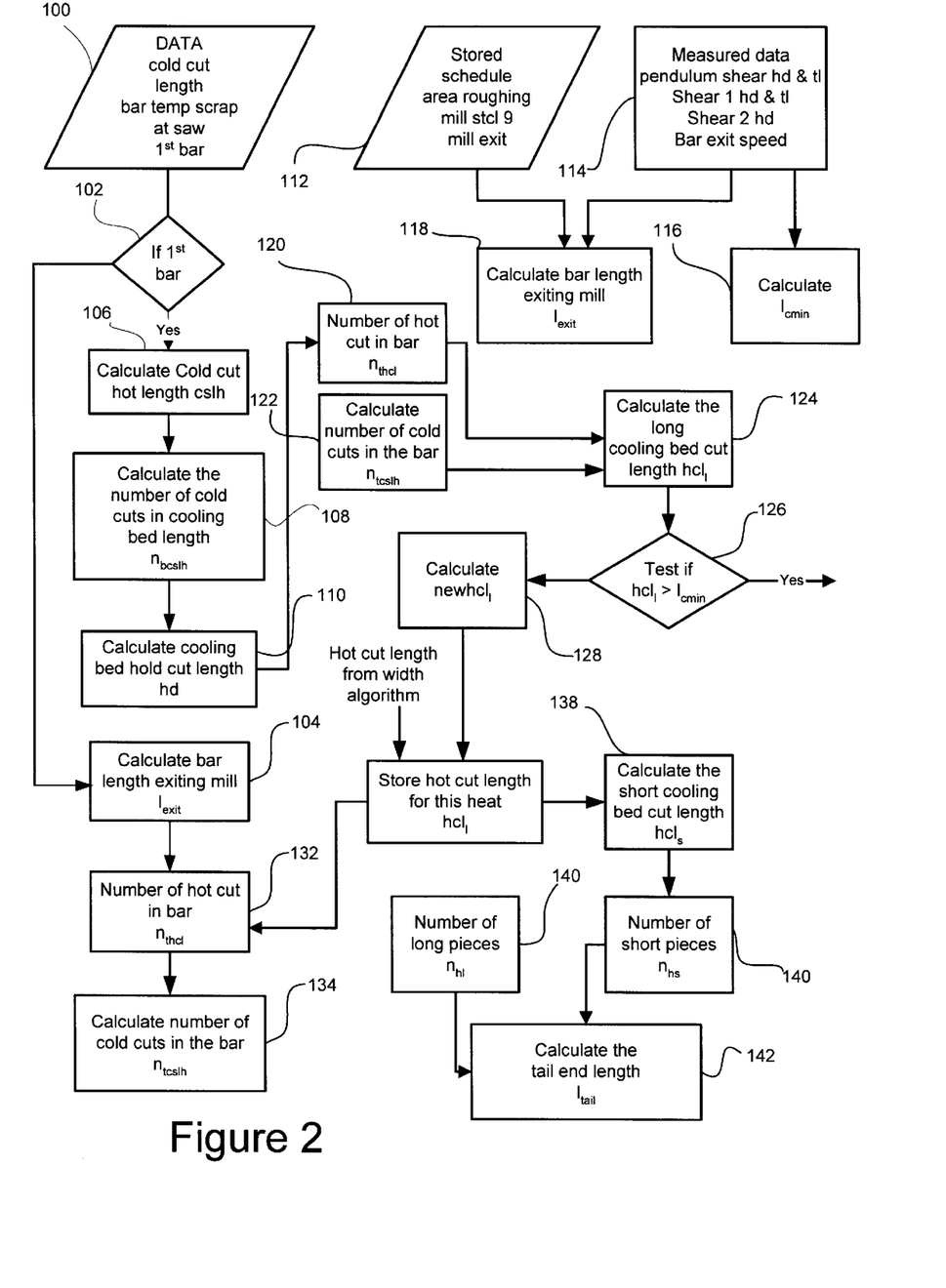
FIG. 2 is a schematic flow diagram illustrating an optimization routine for bar processing using a cooling bed according to one embodiment of the invention.

FIG. 2 is a schematic flow diagram illustrating an optimization routine for bar processing according to one embodiment of the invention. As shown, certain initial data may be input at 100. In some embodiments, initial data may comprise a cold cut length, which, in turn, may be converted to a hot cut length (e.g., by process control 24), the bar temperature, the amount of scrap, etc. At step 102 a determination of whether the bar exiting the mill (e.g., finishing mill 16) is the first bar in a heat. If the result of the determination at step 102 is that the bar is not a first bar, then the process may proceed at step 104.

In some embodiments, other data may be input as indicated at steps 112 and 114. This data may include the area of the bar exiting the roughing mill 10, the area of the bar at an intermediate stand (e.g., a stand before shear 15), the head and tail cut lengths at intermediate shears (e.g., shear 15 and shear 18), and other data.

At step 104 a total length of bar at mill exit may be calculated. This calculation may be performed by an appropriate calculator (e.g., a calculator routine stored in process control 24). For example, total length of bar at mill exit may be calculated according to:

$$l_{exit} = (l_{rhmill} - pd_{hl} - pd_{tl}) \times \frac{A_{rhmill}}{A_{exit}} - (shrl_{hl} + shrl_{tl}) \times \frac{A_{std9}}{A_{exit}} - shr2_{hl}.$$

Otherwise, if a first bar is determined at step 102, the processed may proceed as indicated at step 106.

In some embodiments, step 106 may comprise a calculation of a cold cut hot length. This calculation may be performed by an appropriate calculator (e.g., a calculator routine stored in process control 24). For example, the cold cut hot length may be calculated according to:

$$cslh = csl + csl \times \left(.00675 \times \left[\frac{TEMP-32}{1000}\right] + .001636 \times \left[\frac{TEMP-32}{1000}\right]^2\right) + .75 \times 1ntol.$$

Next, at step 108, a calculation of the number of cold cuts in the cooling bed length may be calculated. This calculation may be performed by an appropriate calculator (e.g., a calculator routine stored in process control 24). For example, the number of cold cuts may be calculated according to:

$$n_{bcslh} = \text{INT} \frac{CB_{length} - SCRAP}{cslh}.$$

Next, at step 110, a calculation of the maximum hot cut length that will fit on the cooling bed (e.g., cooling bed 20) may be calculated. This calculation may be performed by an appropriate calculator (e.g., a calculator routine stored in process control 24). For example, maximum hot cut length that will fit on the cooling bed may be calculated according to:

$$hcl = n_{hcslh} \times cslh + SCRAP$$

In some embodiments, at step 116 a calculation of a minimum length of bar that can be placed on the cooling bed may be performed. This calculation may be performed by an appropriate calculator (e.g., a calculator routine stored in process control 24). For example, minimum length bar that will fit on the cooling bed may be calculated according to:

$$l_{c\,min} = \text{ROUNDUP} \frac{(sbar * ts\,min - SCRAP)}{cslh} * cslh + SCRAP.$$

Check if $l_{c\,min} > l_{cool\,min}$.

If Yes, use calculated value;

If no, $l_{c\,min} = l_{cool\,min}$.

CHECK if $l_{c\,min} > l_{cool\,min}$.

If Yes, use calculation value;

If no, $l_{c\,min} = l_{cool\,min}$.

At step 118 a total length of bar at mill exit may be calculated. This calculation may be performed by an appropriate calculator (e.g., a calculator routine stored in process control 24). For example, total length of bar at mill exit may be calculated according to:

$$l_{exit} = (l_{rhmill} - pd_{hl} - pd_{tl}) \times \frac{A_{rhmill}}{A_{exit}} - (shrl_{hl} + shrl_{tl}) \times \frac{A_{std9}}{A_{exit}} - shr2_{hl}.$$

At step 120 a number of hot cuts in the total bar, as measured coming from the roughing mill 10, may be calculated. This calculation may be performed by an appropriate calculator (e.g., a calculator routine stored in process control 24). For example, a number of hot cuts in the total bar at mill exit may be calculated according to:

$$n_{thcl} = \text{ROUNDUP} \frac{l_{exit}}{hcl}.$$

At step 122 a number of cold cuts in the total bar, as measured coming from the roughing mill, may be calculated. This calculation may be performed by an appropriate calculator (e.g., a calculator routine stored in process control 24). For example, a number of cold cuts in the total bar at mill exit may be calculated according to:

$$n_{tcslh} = \text{ROUNDDOWN} \frac{l_{exit} - n_{thcl} \times \text{SCRAP}}{cslh}.$$

At step 124 the long cooling bed cut length may be calculated in order to determine the longer of the two cut lengths which are placed on cooling bed 20. This calculation may be performed by an appropriate calculator (e.g., a calculator routine stored in process control 24). For example, a long cooling bed cut length may be calculated according to:

$$hcl_l = chlh \times \text{ROUNDUP}\left(\frac{n_{tclsh}}{n_{thcl}}\right) + \text{SCRAP}.$$

At step 126 a determination of whether the long cooling bed cut length is greater than a minimum cooling bed length may be determined. This determination may be performed by an appropriate determiner routine (e.g., stored in process control 24). For example, the long cooling bed cut length may be compared according to:

$$hcl_l - cslh > l_{c\,min}.$$

Figure 3:
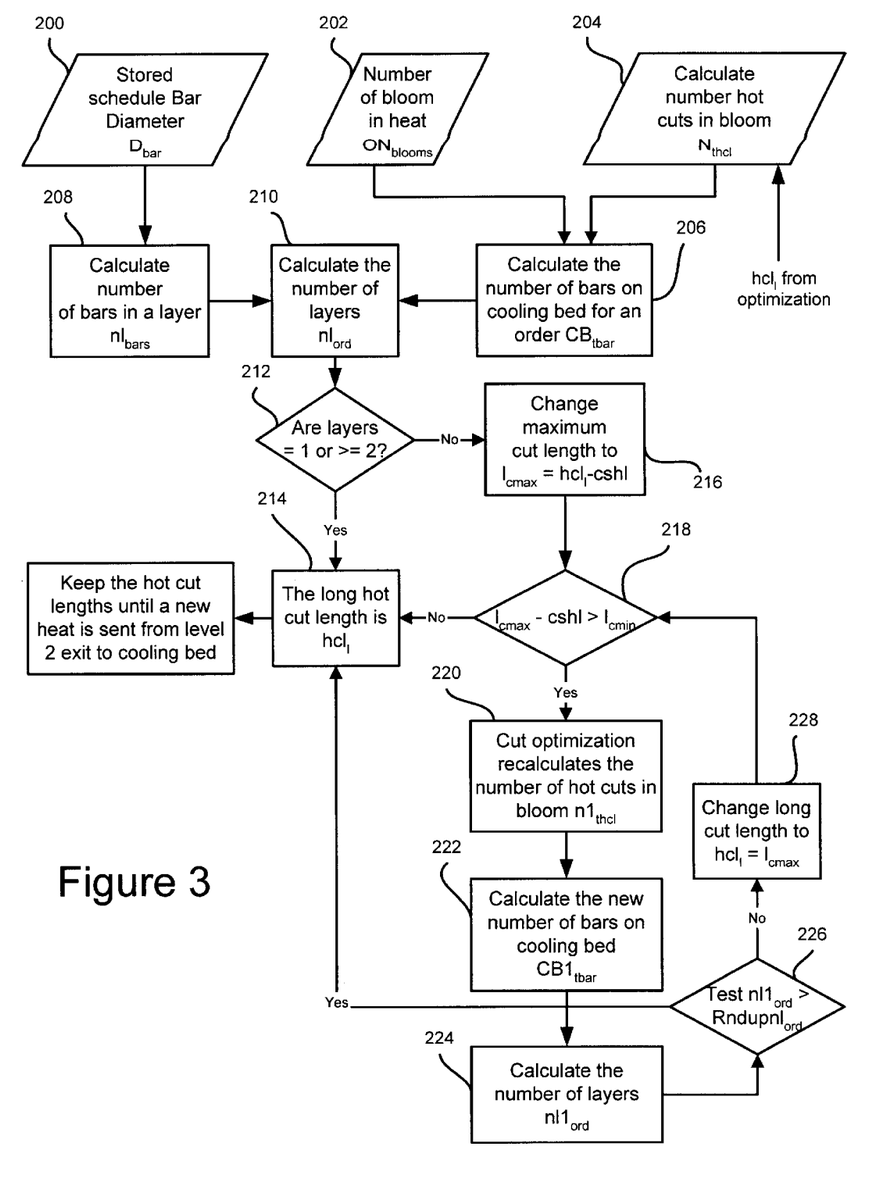
FIG. 3 is a schematic flow diagram illustrating a cooling bed width calculation according to one embodiment of the invention.

In some embodiments, if the long cooling bed cut length is greater than the minimum cooling bed length, the process may move to a width calculation routine (e.g., FIG. 3). If the long cooling bed cut length is not greater than the minimum cooling bed length, the process may move to calculate a new long cooling bed cut length as indicated at step 128.

At step 128 a new long hot cut length may be calculated. This calculation may be performed by an appropriate calculator (e.g., a calculator routine stored in process control 24). For example, a new long hot cut length may be calculated according to:

$$hcl_l = cslh \times \text{ROUNDUP}\left(\frac{l_{c\,min}}{cslh}\right) + cslh + \text{SCRAP}.$$

At step 130 a hot cut length for the current processing heat is stored until the next first bar of a heat comes along. As indicated in FIG. 2, the hot cut length comes from using the long hot cut length calculated in step 128 or using the hot cut length calculated in the width routine (e.g., as in FIG. 3).

At step 132, a calculation of the number of hot cuts in a bar may be made. As indicated, step 132 may be a point to which the process may advance after step 104 if a bar is determined not to be a first bar at step 102. The calculation of the number of hot cuts in a bar may be performed by an appropriate calculator (e.g., a calculator routine stored in process control 24). For example, a number of hot cuts in a bar may be calculated according to:

$$n_{thcl} = \text{ROUNDUP} \frac{l_{exit}}{hcl_l}.$$

At step 134 a number of cold cuts in a bar may be calculated. The calculation of the number of cold cuts in a bar may be performed by an appropriate calculator (e.g., a calculator routine stored in process Control 24). For example, a number of cold cuts in a bar may be calculated according to:

$$n_{tcslh} = \text{ROUNDDOWN} \frac{l_{exit} - n_{thcl} \times \text{SCRAP}}{cslh}.$$

At step 136 a number of long cut pieces may be calculated. The calculation of the number of long cut pieces may be performed by an appropriate calculator (e.g., a calculator routine stored in process control 24). For example, a number long cut pieces may be calculated according to:

$$n_{hl} = \left( \frac{n_{tclsh}}{n_{thcl}} - \text{ROUNDDOWN}\left(\frac{n_{tclsh}}{n_{thcl}}\right) \right) \times n_{thcl}.$$

In some embodiments of the invention, a calculation of the short length which is to be put on the cooling bed (i.e., short cut length) may also be performed. For example, at step 138 a short cut length may be calculated. The calculation of the short cut length may be performed by an appropriate calculator (e.g., a calculator routine stored in process control 24). For example, a short cut length may be calculated according to:

$$hcl_s = cslh \times \text{ROUNDDOWN}\left(\frac{n_{tclsh}}{n_{thcl}}\right) + \text{SCRAP}$$

At step 140 a calculation of a number of short pieces may be performed. The calculation of the number of short pieces may be performed by an appropriate calculator (e.g., a calculator routine stored in process control 24). For example, a number of short pieces may be calculated according to:

$$n_{hs} = n_{thcl} - n_{hl}.$$

At step 142, calculation for an amount of tail scrap may be performed. The calculation of the number of short pieces may be performed by an appropriate calculator (e.g., a calculator routine stored in process Control 24). For example, a tail scrap calculation may be calculated according to:

$$l_{tail} = l_{exit} - (n_{hs} \times hcl_s + n_{hl} \times hcl_l).$$

FIG. 3 is a schematic flow diagram illustrating a cooling bed width calculation according to one embodiment of the invention. As indicated above, in some embodiments of the processing routine, it may be advantageous to calculate a width maximum (e.g., at step 126, if $hcl_l > l_{c\ min}$).

At step 200 certain initial data entered with each new heat may be accessed. For example, a stored schedule, a bar diameter, and other data may be accessed. In addition, the bloom number in the heat $ON_{blooms}$ may be accessed as indicated at step 202.

At step 204 a calculation of a number of hot cuts in the total bar as measured coming from the roughing mill 10 may be performed using the new hot cut length as calculated from step 124. The calculation of the number of hot cuts may be performed by an appropriate calculator (e.g., a calculator routine stored in process control 24). For example, a number of hot cuts calculation may be calculated according to:

$$n_{thcl} = \text{ROUNDUP} \frac{l_{exit}}{hcl_l}.$$

At step 206 a calculation of a number of bars that will be placed on the large cooling bed may be performed. The calculation of the number of bars on the large cooling bed may be performed by an appropriate calculator (e.g., a calculator routine stored in process control 24). For example, a number of bars to be placed on the large cooling bed calculation may be calculated according to:

$$CB_{tbar} = ON_{blooms} \times n_{thcl}.$$

At step 208 a number of bars per layer for a given bar diameter (e.g., the diameter input at step 200) may be calculated. The calculation of the number of bars per layer may be performed by an appropriate calculator (e.g., a calculator routine stored in process control 24). For example, a number of bars per layer calculation may be calculated according to:

$$nl_{bars} = \text{INT} \frac{CS_{max\ width}}{D_{bar}}.$$

At step 210, a calculation of the number of layers in the heat may be performed. The calculation of the number of layers in the heat may be performed by an appropriate calculator (e.g., a calculator routine stored in process control 24). For example, a number of layer in the heat calculation may be calculated according to:

$$nl_{ord} = \frac{CB_{tbar}}{nl_{bars}}.$$

At step 212 a determination is made as to whether the number of layers (e.g., as calculated at step 210) is greater than a predetermined number. For example, a determination may be made whether the number of layers is equal to one, or greater than or equal to two (e.g., $nl_{ord} \geq 2$ or $=1$), or the like. The determination may be made by any appropriate determiner (e.g., a determining routine stored in process control 24).

In some embodiments, for any heat that is larger then two layers, no change to length is made to increase the width. For example, at step 214, after a determination that the number of layers is equal to one or greater than or equal to two, the long hot cut length may be set to the long hot cut length $hcl_l$ (e.g., as calculated from step 124).

At step 216, after a determination that the number of layers is not equal to one or grater than or equal to two, the maximum hot cut length may be adjusted. For example, the maximum hot cut length may be lessened by subtracting one cold cut length from the hot cut length (e.g., $l_{c\ max} = hcl_l - cslh$). The adjustment of the maximum hot cut length may be performed by any suitable adjuster (e.g., an adjuster module stored in process control 24).

At step 218 a determination may be made whether the maximum hot cut length is greater than a predetermined value. For example, the maximum hot cut length may be checked against the minimum cooling bed length (e.g., $l_{c\ max}-\text{cslh} > l_{c\ min}$). The determination may be performed by any suitable determiner (e.g., a determination module stored in process control 24).

If, after step 218, the maximum hot cut length is determined to be less than the predetermined value, the long hot cut length may be set to the long hot cut length $hcl_l$ as indicated at step 214. If the maximum hot cut length is determined to be greater than the predetermined value, the process may advance to step 220.

At step 220 a calculation of the number of hot cuts in a bloom may be performed. The calculation of the number of hot cuts in a bloom may be performed by an appropriate calculator (e.g., a calculator routine stored in process control 24). For example, a number of hot cuts in a bloom calculation may be calculated according to:

$$nl_{thcl} = \text{ROUNDUP} \frac{l_{exit}}{l_{c\max}}.$$

At step 222 a calculation of the number of bars that will be placed on the cooling bed may be performed. The calculation of the number of bars to be placed on the cooling bed may be performed by an appropriate calculator (e.g., a calculator routine stored in process control 24). For example, a number of bars to be placed on the cooling bed calculation may be calculated according to:

$$CB1_{tbar} = ON_{blooms} \times nl_{thcl}.$$

At step 224 a calculation of the number of layers in the heat may be, performed. The calculation of the number of layers in the heat may be performed by an appropriate calculator (e.g., a calculator routine stored in process control 24). For example, a number of layers in the heat calculation may be calculated according to:

$$nll_{ord} = \frac{CB1_{tbar}}{nl_{bars}}.$$

At step 226 a determination is made whether any more layers are to be cut. The determination may be performed by any suitable determiner (e.g., a determination module stored in process control 24). For example, a determination of whether $$nl1_{ord} > \text{ROUNDUP}(nl_{ord})$$

may be made. In some embodiments, if $nl1_{ord}$ is greater than $\text{ROUNDUP}(nl_{ord})$, the process may set the hot cut length (e.g., as indicated at step 214). In some embodiments, if $nl1_{ord}$ is not greater than $\text{ROUNDUP}(nl_{ord})$, the process may create a new maximum cut length according to $$hcl_l = l_{c\ max}$$

as indicated at step 228 and proceed to step 216 for another iteration.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for controlling a bar processing mill, having an exit and a cooling bed, to produce bars of a predetermined cold length, the method comprising:

for a first bar in a processing order, calculating a long hot cut length based, at least in part upon a predetermined cold length; and adjusting the long hot cut length based on a total length of the first bar at the exit, if the long hot cut length is greater than a minimum cooling bed length, and if a number of layers of bars to be processed on the cooling bed is less than a predetermined number.

2. The method of claim 1, wherein the step of adjusting the long hot cut length further comprises:

calculating a number of layers of bars to be processed on the cooling bed, based at least in part upon a the number of bars in the processing order; and determining whether the number of layers greater than a predetermined number, and if it is:

processing the bars using the long hot cut length.

3. The method of claim 1, wherein the bar processing mill further comprises a hot cut shear and a cold cut saw, and wherein the method further comprises:

calculating a mill exit bar length for a bar other than the first bar exiting the exit;

calculating a number of hot shear cuts based at least in part upon the mill exit bar length; and calculating a number of cold saw cuts based at least in part upon the mill exit bar length and the number of hot shear cuts.

4. The method of claim 1, further comprising:

adjusting the long hot cut length by setting a maximum cooling bed hot cut length proportional to the long hot cut length minus one predetermined cold length;

determining whether the maximum cooling bed hot cut length is greater than the minimum cooling bed length, and if it is:

calculating a number of bars to be placed on the cooling bed based at least in part upon the maximum cooling bed hot cut length;

calculating the number of layers based at least in part upon the number of bars to be placed on the cooling bed; and determining whether another layer is to be cut based at least in part upon the number of layers calculated, and if so:

processing the bars using the long hot cut length.

5. The method of claim 4, wherein if the step of determining whether the maximum cooling bed hot cut length is greater than the minimum cooling bed length finds that it is not, the method further comprises:

using the long hot cut length to process the bars.

6. The method of claim 4, wherein if the step of determining whether another layer is to be cut based at least in part upon the number of layers calculated finds that it is not, the method further comprises:

setting the hot cut length equal to the maximum cooling bed hot cut length; and performing another calculation of whether the maximum cooling bed hot cut length is greater than the minimum cooling bed length.

7. A system for controlling a bar processing mill, having an exit and a cooling bed, to produce bars of a predetermined cold length, the system comprising:

a first bar identifier for identifying a first bar in a processing order, a long hot cut length calculator for calculating a long hot cut length based, at least in part upon a predetermined cold length; and a long hot cut length adjuster for adjusting the long hot cut length based on a total length of bar exiting the exit, if the long hot cut length is greater than a minimum cooling bed length, and if a number of layers of bars to be processed on the cooling bed is less than a predetermined number.

8. The system of claim 7, wherein the long hot cut length adjuster further comprises:

a determiner for determining whether the long hot cut length is greater than the minimum cooling bed length;

a layer number calculator for calculating a number of layers of bars to be processed on the cooling bed, based at least in part upon a the number of bars in the processing order; and a layer number determiner for determining whether the number of layers is greater than a predetermined number, and if it is:

processing the bars using the long cut length.

9. The system of claim 7, wherein the bar processing mill further comprises a hot cut saw and a cold cut saw, and wherein the system further comprises:

a mill exit length calculator for calculating a mill exit bar length for a bar other than the first bar exiting the exit;

a hot saw cut calculator for calculating a number of hot saw cuts based at least in part upon the mill exit bar length; and a cold saw cut calculator for calculating a number of cold saw cuts based at least in part upon the mill exit bar length and the number of hot saw cuts.

10. The system of claim 7, further comprising:

a long hot cut length adjuster for adjusting the long hot cut length by setting a maximum cooling bed hot cut length proportional to the long hot cut length minus one predetermined cold length;

a determiner for determining whether the maximum cooling bed hot cut length is greater than the minimum cooling bed length;

a cooling bed bar number calculator for calculating a number of bars to be placed on the cooling bed based at least in part upon the maximum cooling bed hot cut length;

a layer number calculator for calculating the number of layers based at least in part upon the number of bars to be placed on the cooling bed; and a layer cut determiner for determining whether another layer is to be cut based at least in part upon the number of layers calculated.

11. The system of claim 10, further comprising:

a hot cut length adjuster for setting the hot cut length equal to the maximum cooling bed hot cut length.

12. A method for controlling an SBQ mill having an exit and a cooling bed to produce steel bars of a predetermined cold length, the method comprising:

for a first steel bar in a processing order, calculating a long hot cut length based, at least in part upon a predetermined cold length; and adjusting the long hot cut length based on a total length of bar exiting the exit, if the long hot cut length is greater than a minimum cooling bed length, and if a number of layers of steel bars to be processed on the cooling bed is less than a predetermined number.

13. The method of claim 12, wherein the step of adjusting the long hot cut length further comprises:

calculating a number of layers of steel bars to be processed on the cooling bed, based at least in part upon a the number of steel bars in the processing order; and determining whether the number of layers is greater than a predetermined number, and if it is:

using the long cut length to process the steel bars.

14. The method of claim 12, wherein the SBQ mill further comprises of a hot cut shear and a cold cut saw, and wherein the method further comprises:

calculating a mill exit bar length for a steel bar other than the first steel bar exiting the exit;

calculating a number of hot shear cuts based at least in part upon the mill exit steel bar length; and calculating a number of cold saw cuts based at least in part upon the mill exit steel bar length and the number of hot shear cuts.

15. The method of claim 12, further comprising:

adjusting the long hot cut length by setting a maximum cooling bed hot cut length proportional to the long hot cut length minus one predetermined cold length;

determining whether the maximum cooling bed hot cut length is greater than the minimum cooling bed length, and if it is:

calculating a number of steel bars to be placed on the cooling bed based at least in part upon the maximum cooling bed hot cut length;

calculating the number of layers based at least in part upon the number of steel bars to be placed on the cooling bed; and determining whether another layer is to be cut based at least in part upon the number of layers calculated, and if so:

using the long cut length to process the steel bars.

16. The method of claim 15, wherein if the step of determining whether the maximum cooling bed hot cut length is greater than the minimum cooling bed length finds that it is not, the method further comprises:

using the long hot cut length to process the steel bars.

17. The method of claim 15, wherein if the step of determining whether another layer is to be cut based at least in part upon the number of layers calculated finds that it is not, the method further comprises:

setting the hot cut length equal to the maximum cooling bed hot cut length; and performing another calculation of whether the maximum cooling bed hot cut length is greater than the minimum cooling bed length.

18. A system for controlling an SBQ mill having an exit and a cooling bed to produce steel bars of a predetermined cold length, the system comprising:

a first steel bar identifier for identifying a first steel bar in a processing order, a long hot cut length calculator for calculating a long hot cut length based, at least in part upon a predetermined cold length; and a long hot cut length adjuster for adjusting the long hot cut length based on a total length of bar exiting the exit, if the long hot cut length is greater than a minimum cooling bed length, and if a number of layers of steel bars to be processed on the cooling bed is less than a predetermined number.

19. The system of claim 18, wherein the long hot cut length adjuster further comprises:

a determiner for determining whether the long hot cut length is greater than the minimum cooling bed length;

a layer number calculator for calculating a number of layers of steel bars to be processed on the cooling bed, based at least in part upon a the number of steel bars in the processing order; and a layer number determiner for determining whether the number of layers is greater than a predetermined number, and if it is setting the long hot cut length equal to the minimum cooling bed length.

20. The system of claim 18, wherein the SBQ mill further comprises a hot cut saw and a cold cut saw, and wherein the system further comprises:

a mill exit length calculator for calculating a mill exit bar length for a steel bar other than the first steel bar exiting the exit;

a hot saw cut calculator for calculating a number of hot saw cuts based at least in part upon the mill exit bar length; and a cold saw cut calculator for calculating a number of cold saw cuts based at least in part upon the mill exit bar length and the number of hot saw cuts.

21. The system of claim 18, further comprising:

a long hot cut length adjuster for adjusting the long hot cut length by setting a maximum cooling bed hot cut length proportional to the long hot cut length minus one predetermined cold length;

a determiner for determining whether the maximum cooling bed hot cut length is greater than the minimum cooling bed length;

a cooling bed bar number calculator for calculating a number of steel bars to be placed on the cooling bed based at least in part upon the maximum cooling bed hot cut length;

a layer number calculator for calculating the number of layers based at least in part upon the number of steel bars to be placed on the cooling bed; and a layer cut determiner for determining whether another layer is to be cut based at least in part upon the number of layers calculated.

22. The system of claim 21, further comprising:

a hot cut length adjuster for setting the hot cut length equal to the maximum cooling bed hot cut length.

* * * * *